(12) United States Patent (10) Patent No.: US 8,096,621 B2
Braun (45) Date of Patent: Jan. 17, 2012

(54) VEHICLE SEAT ASSEMBLY

(75) Inventor: Kenneth Braun, Mequon, WI (US)

(73) Assignee: Milsco Manufacturing Company, Milwaukee, WI (US)

( * ) Notice: Subject to any disclaimer, the term of this patent is extended or adjusted under 35 U.S.C. 154(b) by 93 days.

(21) Appl. No.: 12/484,121

(22) Filed: Jun. 12, 2009

(65) Prior Publication Data

US 2009/0315383 A1 Dec. 24, 2009

Related U.S. Application Data

(60) Provisional application No. 61/060,808, filed on Jun. 12, 2008.

(51) Int. Cl.
*A47C 7/00* (2006.01)
*A47C 7/02* (2006.01)
(52) U.S. Cl. ........... 297/440.15; 297/440.1; 297/440.16; 297/440.2; 297/440.21; 297/183.6; 297/183.8
(58) Field of Classification Search ............. 297/440.15, 297/440.16, 183.6, 183.7, 183.8, 440.1, 440.2, 297/440.21
See application file for complete search history.

(56) References Cited

U.S. PATENT DOCUMENTS

| | | | | |
|---|---|---|---|---|
| 793,863 A | * | 7/1905 | Vogel | 297/183.8 |
| 1,224,861 A | * | 5/1917 | Walker | 297/183.8 |
| 1,261,246 A | * | 4/1918 | Lambert | 297/183.8 |
| 1,650,961 A | * | 11/1927 | Rothman | 297/183.8 |
| 2,450,093 A | * | 9/1948 | Richardson | 297/183.8 |
| 2,577,050 A | | 12/1951 | Van Buren | |
| 2,599,301 A | | 6/1952 | Van Buren | |
| 2,784,769 A | * | 3/1957 | Fisher | 297/440.15 X |
| 2,832,397 A | * | 4/1958 | Premo | 297/440.15 |
| 2,847,062 A | | 8/1958 | Henrikson et al. | |
| 3,000,669 A | * | 9/1961 | Silverman | 297/451.1 |
| 3,036,864 A | * | 5/1962 | Arai | 297/440.16 X |
| 3,111,344 A | * | 11/1963 | Hoven et al. | 297/452.65 |
| 3,145,050 A | | 8/1964 | Edwards | |
| 3,173,723 A | | 3/1965 | Hoven et al. | |
| 3,625,565 A | | 12/1971 | Barecki | |
| 3,841,704 A | | 10/1974 | Platner et al. | |
| 3,851,914 A | | 12/1974 | Nii | |
| 3,964,789 A | | 6/1976 | Platner et al. | |
| 4,099,774 A | | 7/1978 | Sandham | |
| 4,123,105 A | * | 10/1978 | Frey et al. | 297/451.1 |

(Continued)

FOREIGN PATENT DOCUMENTS

JP 2005-342025 12/2005

(Continued)

*Primary Examiner* — Rodney B White
(74) *Attorney, Agent, or Firm* — Boyle Fredrickson, S.C.

(57) ABSTRACT

A seat assembly including a base and backrest having integrally formed coupler sockets that each receives respective portions of at least one coupler that preferably is an elongate angled coupling tube that joins the base and backrest while serving as a frame. The base and backrest have mating surfaces that abut when assembled to the at least one coupler with one mating surface having a tongue that is received in a groove formed in the other mating surface helping to keep the coupler seated in at least one of the sockets. In a preferred embodiment, each socket includes an elongate channel. In a preferred embodiment, a pair of coupling tubes are used with mounting portions exposed to which seating hardware is attachable. Integrally formed sockets can also be provided for attachment of other features that include armrests and/or hip restraints.

25 Claims, 12 Drawing Sheets

U.S. PATENT DOCUMENTS

| | | |
|---|---|---|
| 4,199,189 A | 4/1980 | Neumann |
| 4,365,840 A * | 12/1982 | Kehl et al. .................. 297/440.2 |
| 4,407,542 A | 10/1983 | Kehl et al. |
| 4,432,582 A | 2/1984 | Wiesmann et al. |
| 4,466,665 A | 8/1984 | Aronowitz et al. |
| 4,493,285 A | 1/1985 | Williams |
| 4,527,832 A * | 7/1985 | McMains et al. .... 297/440.15 X |
| 4,545,613 A | 10/1985 | Martel et al. |
| 4,662,681 A | 5/1987 | Favaretto |
| 4,776,635 A * | 10/1988 | Halliez .................... 297/440.15 |
| 4,869,551 A * | 9/1989 | Lathers ...................... 297/440.1 |
| 4,989,890 A | 2/1991 | Lockard et al. |
| 5,074,621 A * | 12/1991 | McDonald ............... 297/440.15 |
| 5,108,149 A | 4/1992 | Ambasz |
| 5,308,146 A * | 5/1994 | Chou ....................... 297/440.16 |
| 5,333,368 A | 8/1994 | Kriener et al. |
| 5,464,273 A | 11/1995 | Makoto |
| 5,498,065 A * | 3/1996 | Tosoni ................. 297/440.16 X |
| 5,516,180 A | 5/1996 | Eavenson, Sr. et al. |
| 5,542,743 A | 8/1996 | Olson et al. |
| 5,547,259 A | 8/1996 | Fredrick |
| 5,683,139 A | 11/1997 | Golynsky et al. |
| 5,711,576 A | 1/1998 | Olson et al. |
| D390,385 S | 2/1998 | Dammermann et al. |
| 5,730,495 A | 3/1998 | Tuman, II |
| 5,782,536 A | 7/1998 | Heidmann et al. |
| 5,810,439 A | 9/1998 | Roslund, Jr. |
| 5,865,508 A * | 2/1999 | Martin ................. 297/440.15 X |
| 5,904,397 A | 5/1999 | Fismen |
| 5,944,382 A | 8/1999 | Ambasz |
| 5,961,184 A | 10/1999 | Balderi et al. |
| 6,027,169 A | 2/2000 | Roslund, Jr. |
| 6,070,940 A | 6/2000 | Wu |
| 6,105,183 A | 8/2000 | Bly |
| 6,151,765 A * | 11/2000 | Asplund .............. 297/440.16 X |
| 6,199,952 B1 | 3/2001 | Davis |
| 6,322,147 B1 | 11/2001 | Leib |
| D453,078 S | 1/2002 | Yamazaki et al. |
| D453,576 S | 2/2002 | Scalzott |
| 6,371,560 B1 | 4/2002 | Fulford et al. |
| D461,348 S | 8/2002 | Holbrook et al. |
| 6,554,366 B2 * | 4/2003 | Zeeuw et al. ............. 297/440.15 |
| 6,682,145 B2 | 1/2004 | Wilderson et al. |
| 6,799,798 B1 * | 10/2004 | Mandart et al. ............ 297/183.6 |
| 6,820,935 B1 | 11/2004 | Cioncada |
| 6,843,530 B1 | 1/2005 | Wu |
| 6,974,191 B2 | 12/2005 | Serhan |
| 7,472,959 B1 * | 1/2009 | Ratza et al. .......... 297/440.15 X |
| 2001/0002763 A1 * | 6/2001 | Roberts et al. ....... 297/440.15 X |
| 2003/0102700 A1 | 6/2003 | Lin |
| 2003/0209928 A1 | 11/2003 | Haney |
| 2004/0056517 A1 | 3/2004 | Farber |
| 2005/0099052 A1 | 5/2005 | Bertolini et al. |
| 2006/0076816 A1 | 4/2006 | Fujita et al. |
| 2010/0007163 A1 * | 1/2010 | Almeida et al. ....... 297/183.6 X |
| 2010/0019551 A1 * | 1/2010 | Oviedo ..................... 297/183.6 |

FOREIGN PATENT DOCUMENTS

| | | |
|---|---|---|
| JP | 2006-232123 | 9/2006 |

* cited by examiner

VEHICLE SEAT ASSEMBLY

CROSS-REFERENCE

This application claims the benefit under 35 U.S.C. §119 (e) of U.S. Provisional Application Ser. No. 61/060,808, filed Jun. 12, 2008, the entirety of which is expressly incorporated by reference herein.

FIELD

The present invention relates to a seat assembly and more particularly to a low cost, easy to assemble, and modular seat assembly that is well suited for vehicle seating applications.

BACKGROUND

One common seat construction, equipped with an integrated headrest, is manufactured using a full steel seat frame to which seat cushions, backrest cushions, upholstery, and in some applications, decorative shrouds are attached. Full-framed seats may also include additional mounting features, typically at significant additional cost, for attaching armrests, hip restraints, and other accessories.

Another common seat construction utilizes a one-piece seat shell or pan containing both the seat base and the backrest base, typically fabricated by drawing steel or blow molding plastic. This type of seat is commonly found in off-road utility vehicles, industrial equipment, construction equipment and agricultural tractors. While one-piece seat shells fabricated using these manufacturing methods can provide a tall backrest for supporting the upper back of a seated occupant, occupant head support is typically achieved by adding a separate structure to the backrest of the shell. The strength and stiffness of a one-piece molded shell must therefore be able to withstand the loads applied to the occupant head support portion, increasing the overall cost of a seat not containing the occupant head support portion. Furthermore, integrating the occupant head support portion into the one-piece seat shell is typically not practical due to the tooling investment required to produce such a large part. Additionally, larger molded or drawn steel parts typically require high tonnage presses that are not as readily available, limiting manufacturing flexibility.

Accordingly, there is a need for a low-cost vehicle seat assembly that overcomes at least some of these drawbacks.

SUMMARY

The present invention is directed to a seat assembly having a seat base that is joined by a coupler to a backrest base that is configurable with integrated headrest support. In a preferred embodiment, cooperation between the seat base and backrest base help keep the seat assembly assembled while also strengthening the assembly. The seat base and backrest base are also integrally configurable for attachment of modular features that include a grab handle, armrests and/or hip restraints.

The seat base is configured with a socket arrangement that receives a coupler that engages the backrest base. In a preferred embodiment, the seat base has a pair of sockets that communicate with integrally formed channels that each receives one end of an L-shaped coupling tube of the coupler. The backrest base has a pair of channels that each communicates with a socket at one end that defines a coupling tube anchor pocket in which an opposite end of a corresponding one of the coupling tubes is received. The seat base and backrest base have mating surfaces that mate during assembly to the coupling tubes with the mating surfaces including a tongue and groove configuration that helps interlock the seat base and backrest base. The interlock provided by the tongue and groove engagement helps keep the coupling tubes in their respective sockets in at least one of the seat base and backrest base thereby helping to prevent disassembly.

The seat base and backrest base have integrally formed mounts and sockets that enable modular features to be attached to the seat assembly. In one preferred embodiment, the seat base has a pair of sockets integrally formed in a sidewall in which a tubular end of a armrest or hip restraint frame is inserted. In another preferred embodiment, mounts are integrally formed in the backrest base to which a grab handle is mountable. Other modular features and attachments can be assembled to the seat base and/or backrest base in this manner.

Portions of each coupling tube are exposed along the bottom of the seat base forming mounts to which hardware is attached, such as brackets, seat adjuster components and the like. To further help accommodate such hardware, the seat base can have integrally formed clearance pockets in its bottom surface.

Other advantages, benefits and features of the present invention will become apparent to those skilled in the art upon reading the detailed description and viewing the related drawings.

DRAWING DESCRIPTION

One or more preferred exemplary embodiments of the invention are illustrated in the accompanying drawings in which like reference numerals represent like parts throughout and in which.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

FIGS. 1-14 illustrate a preferred embodiment of a modular seat assembly 30 that is particularly well suited for use in vehicle seating applications including off-road vehicle seating applications. The seat assembly 30 has a seat base 32 attached to a backrest base 34 by a coupling arrangement 36 that includes at least one elongate coupler and preferably a plurality of elongate couplers 38, 40. Both the seat base 32 and backrest base 34 are integrally formed in a manner that releasably receives the couplers 38, 40 of the coupling arrangement 36. In addition, the seat base 32 and backrest base 34 can be configured to cooperate with one another when assembled to the couplers 38, 40 in a manner that helps prevent disassembly. A seat assembly 30 constructed in accordance with the present invention advantageously uses a minimum of components and fasteners while producing a seat assembly 30 of robust construction, which is durable, quick and easy to assemble, inexpensive, lightweight and strong.

The seat base 32 carries a seat cushion 42 that can be a separately formed component. The backrest base 34 has a back or lumbar supporting portion 44 that carries a backrest cushion 46 that can also be a separately formed component. In the preferred embodiment shown in FIGS. 1-3, the backrest base 34 also includes a headrest supporting portion 48 that can carry a head rest cushion 50. Cushions 42 and 46 each have a central rib 52, 54 that is received in a centrally located channel 56, 58 respectively formed in the seat base 32 and backrest base 34 that help locate the cushion during assembly and can also help provide seat occupant support. Each of these cushions 42, 46 and 50 can be attached, such as by using fasteners, an adhesive or another means of attachment.

The seat assembly 30 is advantageously easily configurable with add-on features that include a generally C-shaped or U-shaped grab handle 60 as well as an armrest 62, which can also function as a hip restraint. While only one armrest is shown, the seat assembly 30 can be equipped with a pair of them if desired. Likewise, while only one grab handle 60 is shown, a pair of them can be employed if desired. Each grab handle 60 includes a handle grip 64 that can be formed of metal or molded of plastic or the like with the handle grip 64 attached using a plurality of fasteners 66 to the back of the backrest base 34. Where a fastener 66 is used, it can be a push-type plastic, e.g., nylon, fastener, such as a plastic push-in clip, a plastic Christmas tree clip, a plastic rivet, e.g., snap rivet, a metallic pull through mandrel blind rivet, or the like. A grab handle 60 can be mounted on the rear of the backrest base 34 on either side or on both sides of the backrest base 34.

With reference to FIGS. 3 and 5-7, the armrest 62 is an assembly that includes an armrest cover 80 that can include an upper surface that is contoured (not shown) to support an arm of a seat occupant thereon if desired. Such a cover 80 can be of one piece construction or can be made of more than one piece secured using one or more fasteners (not shown) or the like. In one preferred embodiment, the cover 80 is a sleeve that fits over a generally U-shaped tubular armrest frame 82 that is attached to the seat base 32. Such a tubular armrest frame 82 can be formed of a single piece of extruded hollow tube that can be made of a metal, such as steel, aluminum, an alloy thereof or another suitable material. Where of tubular construction, the armrest frame 82 can be of hollow construction and have a generally circular cross-section.

Figure 5:
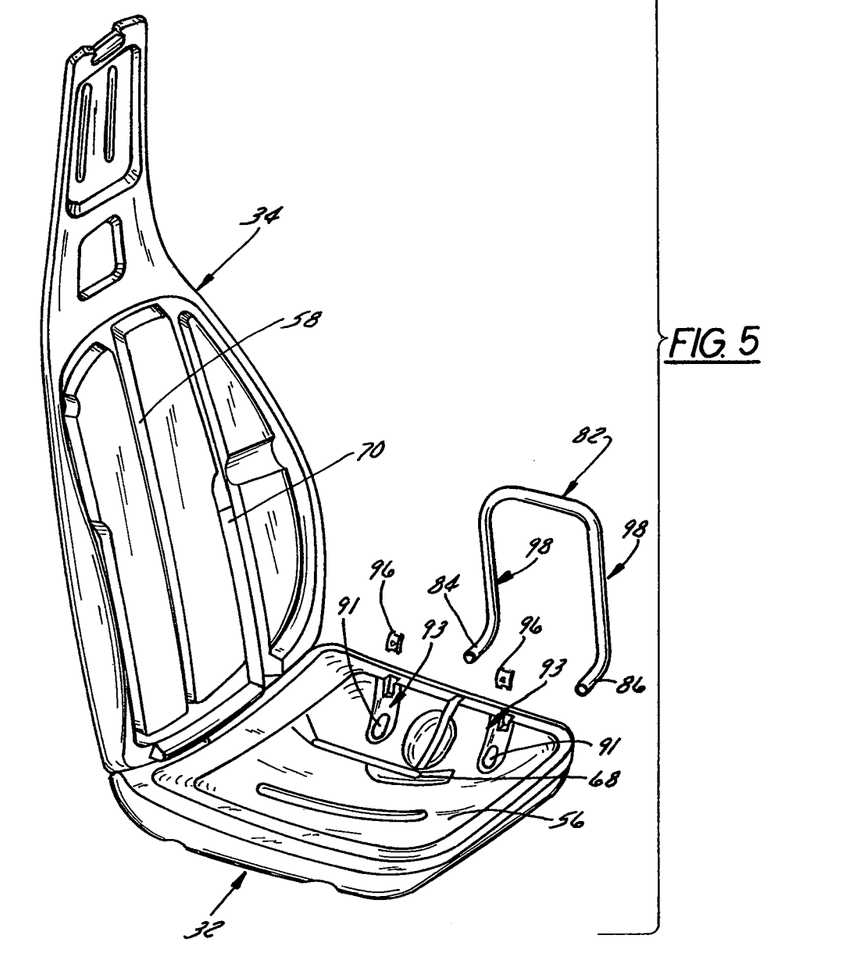
FIG. 5 is a perspective view of the seat base, backrest base and coupler shown in FIG. 3 with a modular tubular armrest/hip restraint frame exploded.
Figure 6:
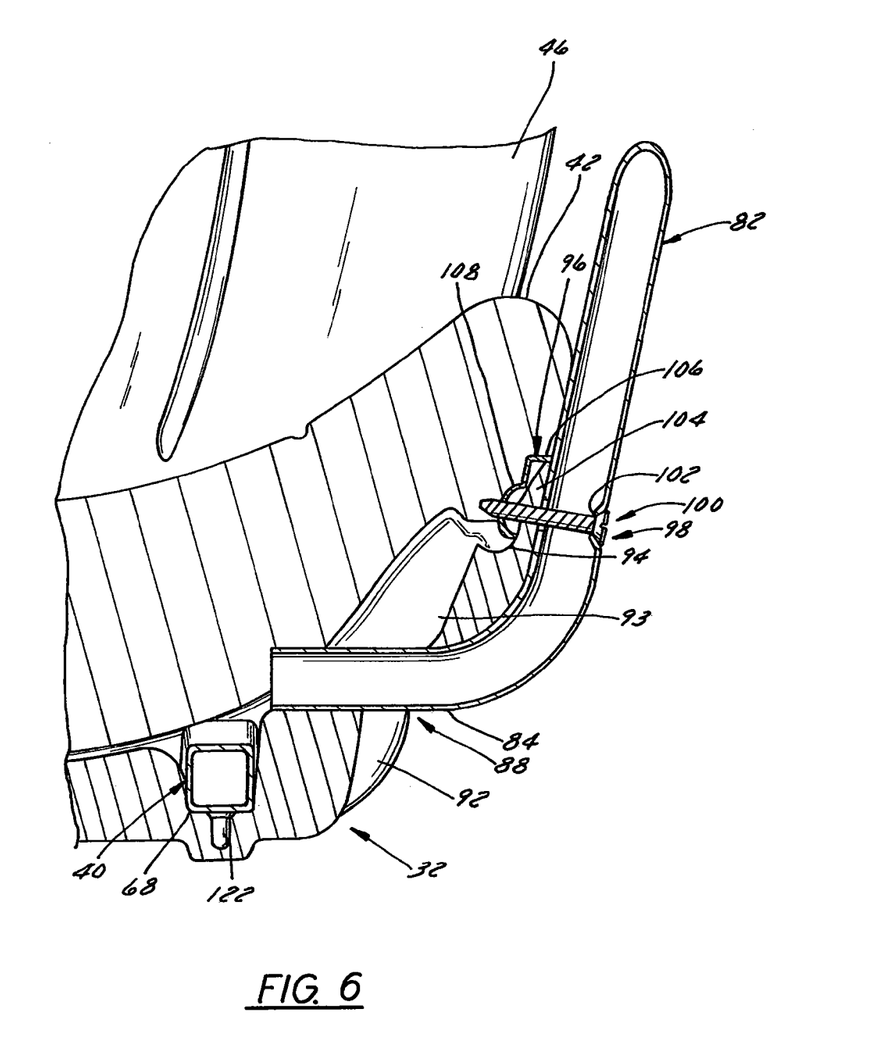
FIG. 6 is a cross sectional view of the armrest/hip restraint frame assembled to the seat base.

With specific reference to FIG. 6, the armrest frame 82 has a pair of right-angled tubular mounting arms 84, 86 that are each received in a corresponding mounting socket 88, 90 integrally formed in each sidewall 92 of the seat base 32. Each socket 88, 90 includes a bore 91 through the seat base sidewall 92 through which a corresponding one of the armrest frame arms 84, 86 is telescopingly inserted during assembly. As is best shown in FIG. 5, each bore 91 communicates with a recessed arm cradle channel 93 integrally formed in the seat base 32 that can be configured to help provide side-to-side restraining support to an inserted armrest frame arm 84 or 86. Referring once again to FIG. 6, the seat base 32 also includes a clip-anchoring pocket 94 integrally formed inboard the sidewall 92 above and adjacent each armrest arm mounting socket 88, 90 that receives a fastener-engaging clip 96 that receives a fastener 98 of an anchor assembly 100 used to anchor the armrest frame 82 to the base 32. Fastener 98 can be a screw that is inserted through a bore 102 in each frame arm 84, 86 and threaded through an upwardly extending anchor flange 104 of the base sidewall 92 and a corresponding one of the fastener-engaging clips 96 after each frame arm 84, 86 is inserted into a respective one of the sockets 88, 90 formed in the seat base 32. Fastener-engaging clip 96 has a generally U-shaped clip body 106 to which a nut 108 or the like is attached through which the threaded end of the fastener 98 is threaded during armrest assembly.

Figure 7:
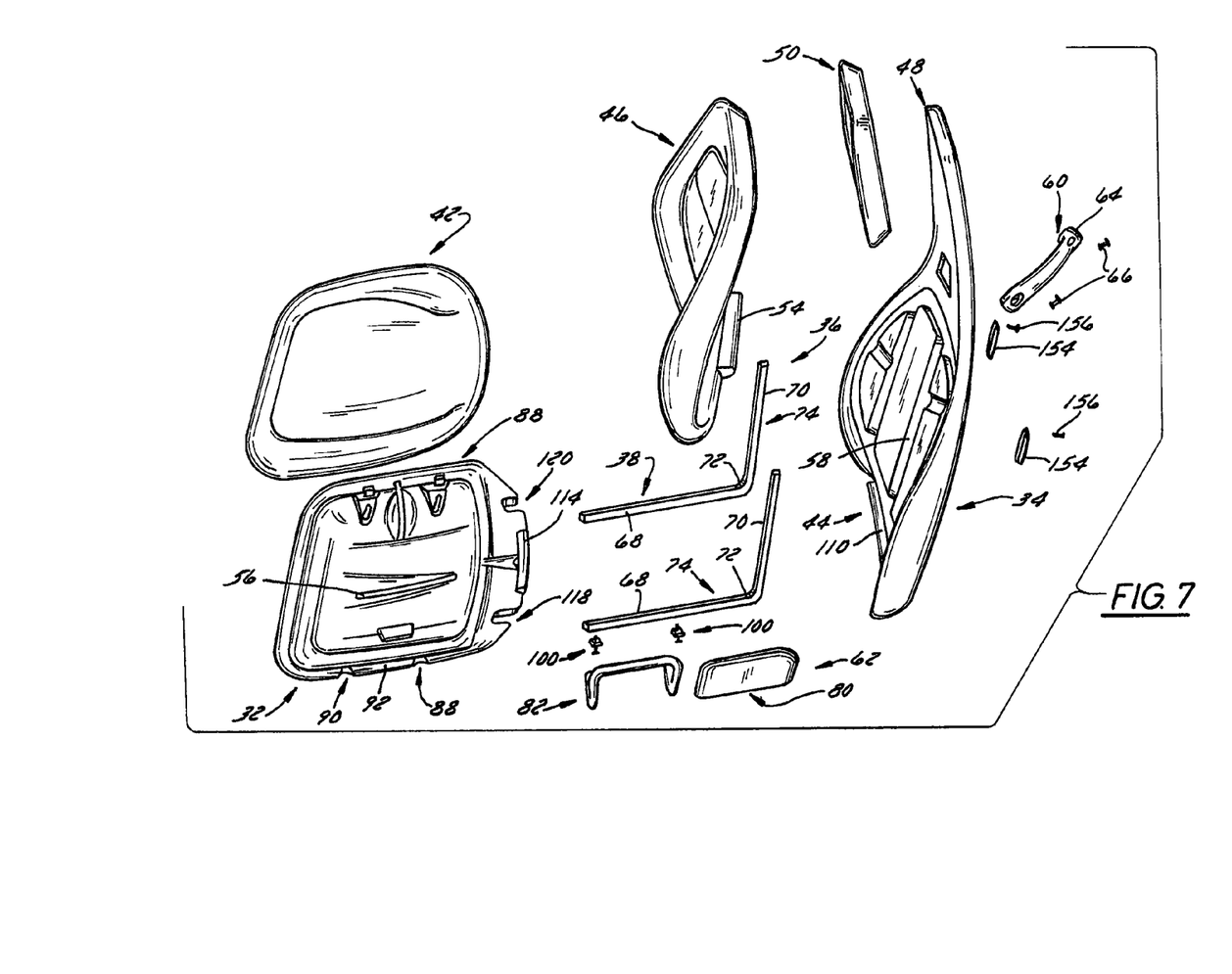
FIG. 7 is an exploded view of the seat assembly of FIG. 1.

As previously discussed above, the couplers 38 and 40 are used to join the seat base 32 to the backrest base 34. As is best shown in FIG. 7, each coupler 38 and 40 is generally L-shaped having an elongate seat base coupling section 68 that slidably engages the seat base 32 and another elongate backrest base coupling section 70 that slidably engages the backrest base 34 separated by a bend 72 therebetween. In a preferred embodiment, each elongate coupler 38 and 40 is of tubular construction that can be made of a metal, such as steel, aluminum, an alloy thereof or the like. In a preferred embodiment, each elongate coupler 38 and 40 is a generally L-shaped integrally formed tube 74 that is of hollow construction thereby reducing weight while also providing strength. Each such coupling tube 38 and 40 can have a generally square or rectangular cross-section for increased strength and rigidity as well as to ease assembly.

The elongate coupling tubes 38 and 40 engage the seat base 32 and backrest base 34 on opposite sides of a seat centerline that extends along and longitudinally bisects corresponding rib recess 56, 58 with each tube 38 and 40 being uniformly spaced relative thereto. In a preferred embodiment, the tubes 38 and 40 are parallel to one another when assembled to the seat base 32 and backrest base 34.

In a preferred embodiment, the seat base coupling section 68 of each coupling tube 38 and 40 has a length greater than half of the total fore-aft dimension of the seat base 32. As a result, when each coupling tube 38 and 40 is assembled to the seat base 32, the base coupling section 68 extends at least to and preferably beyond halfway into the base in a fore-aft direction. In one preferred embodiment, each base coupling section 68 has a sufficient length so as to extend at least two-thirds of the fore-aft dimension of the seat base. The backrest base coupling section 70 can be configured to have such a length or lengths relative to the back or lumbar supporting section 44 of the backrest base 34.

Figures 3, 4:
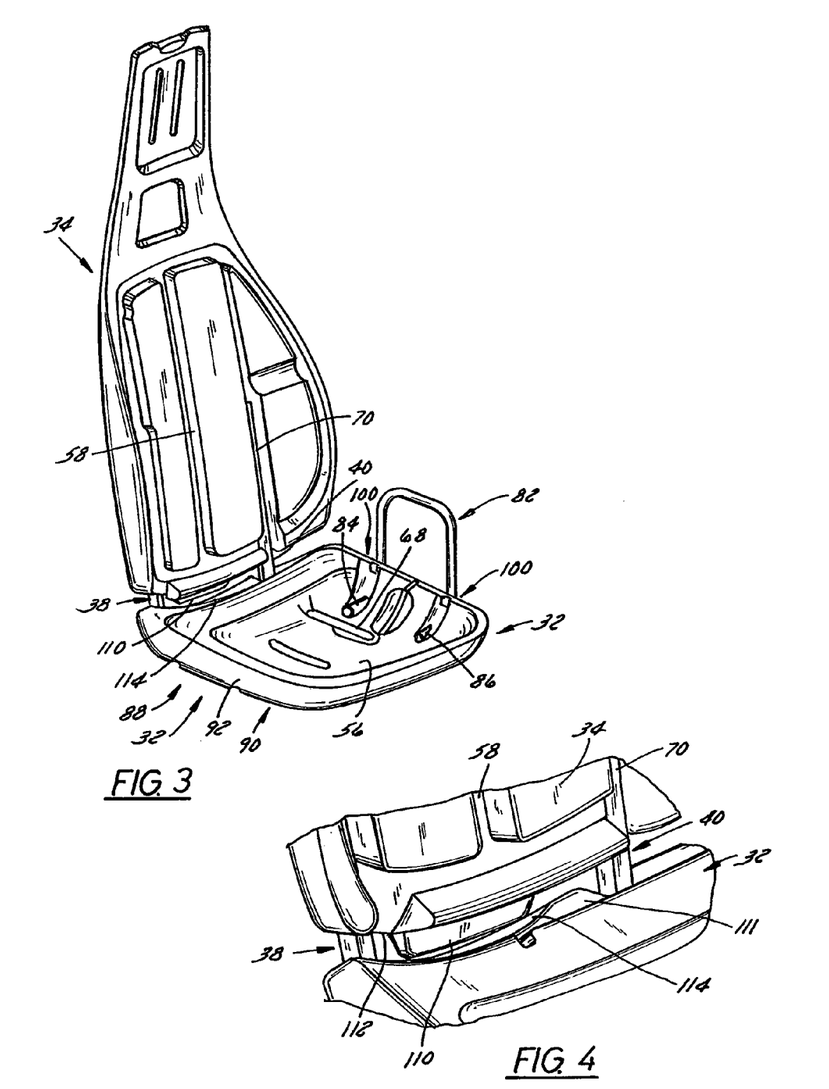
FIG. 3 is a perspective view of a seat base and backrest base assembled using a coupler.
FIG. 4 an enlarged partial fragmentary view of mating surfaces of the seat base and backrest base that includes a tongue and groove interlocking arrangement.

With reference to FIGS. 3 and 4, the seat base 32 and the backrest base 34 mates and cooperates with one another when assembled to the coupling tubes 38 and 40 in a manner that helps more positively secure the assembly 30 by keeping the seat base coupling sections 68 in engagement with the seat base 32. The backrest base 34 has a rib 110 that extends outwardly from a bottom mating surface 112 that functions as a tongue 110 that is received in a recess 114 that functions as a groove 114 integrally formed in a top mating surface 116 of the seat base 32 when the backrest base 34 is brought into contact with the seat base 32 when being assembled together via coupling tubes 38 and 40 as depicted in FIGS. 3 and 4. When the seat base 32 and backrest base 34 are completely assembled to coupling tubes 38 and 40, their respective end walls 112, 116 abut with tongue 110 received in groove 114. In addition to helping to lock the assembly 30 together, the abutment between end walls 112, 116 and the coupling provided between the tongue 110 and groove 114 engagement, help the backrest base 34 better handle forces and moments applied by a seat occupant against the backrest and/or headrest during use and operation.

Figure 1:
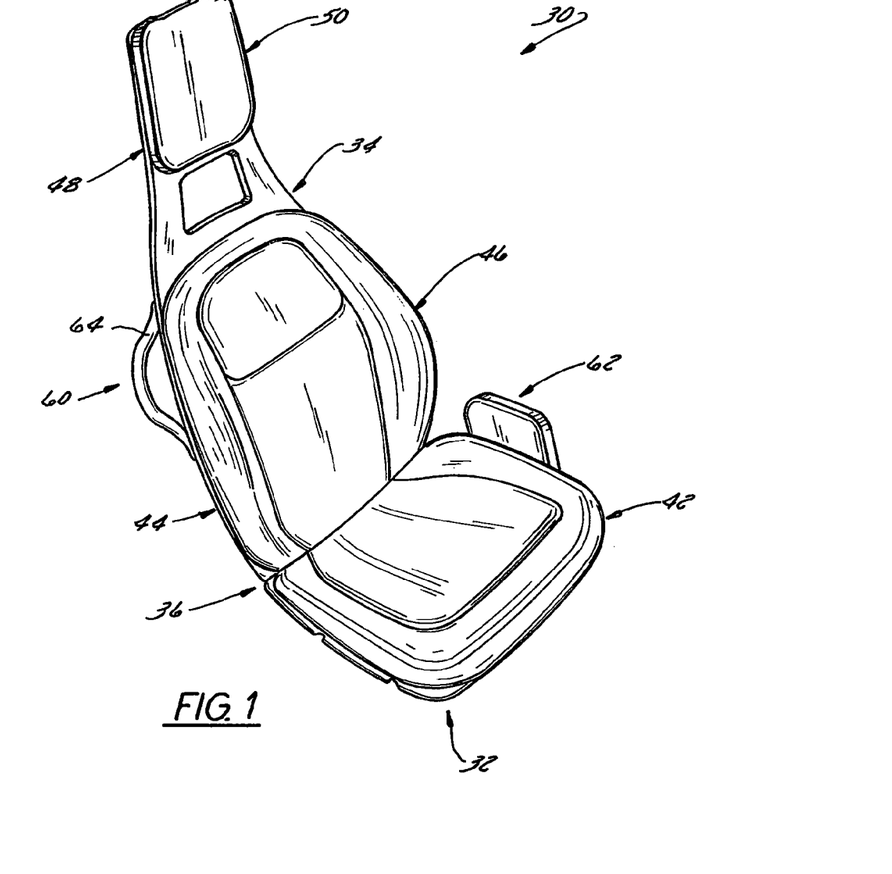
FIG. 1 is a top perspective view of a preferred embodiment of seat assembly constructed in accordance with the present invention.
Figure 2:
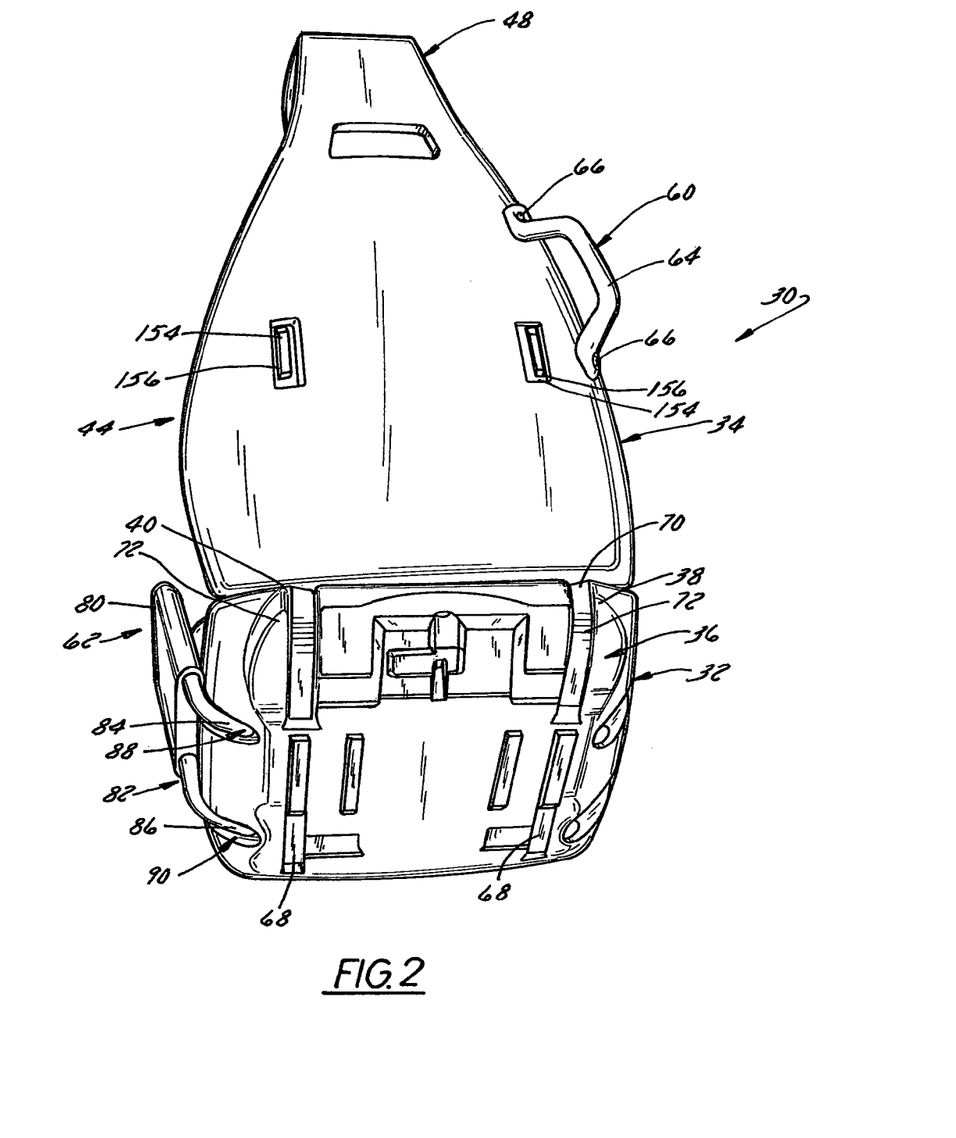
FIG. 2 is a rear perspective view of the seat assembly of FIG. 1.
Figure 8:
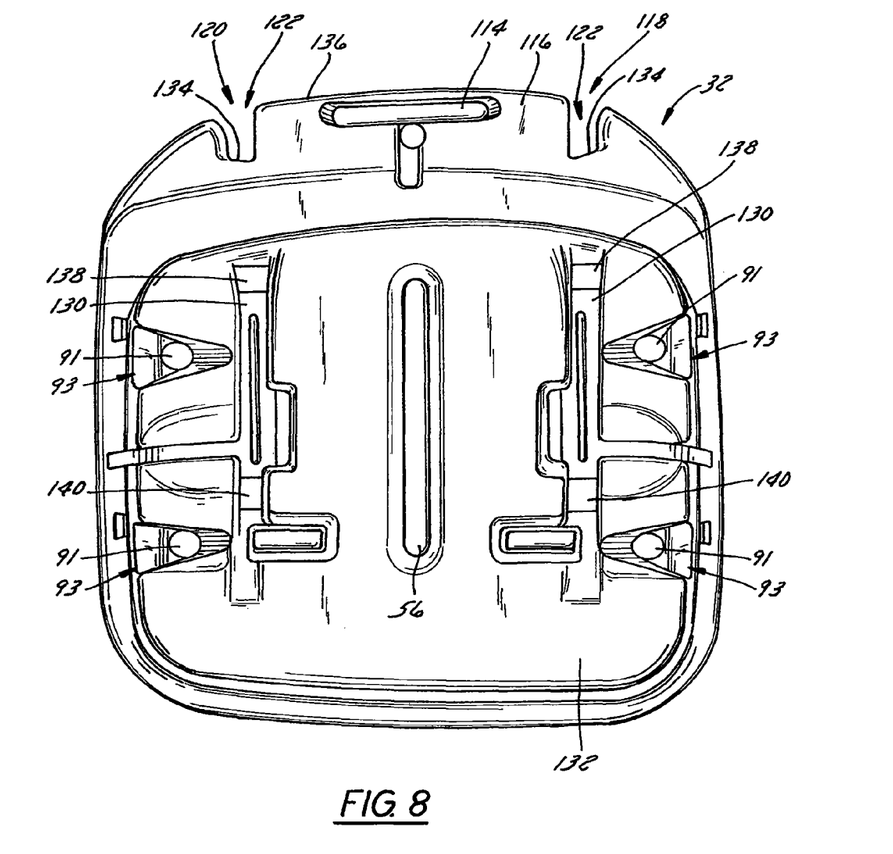
FIG. 8 is a top plan view of the seat base.
Figure 9:
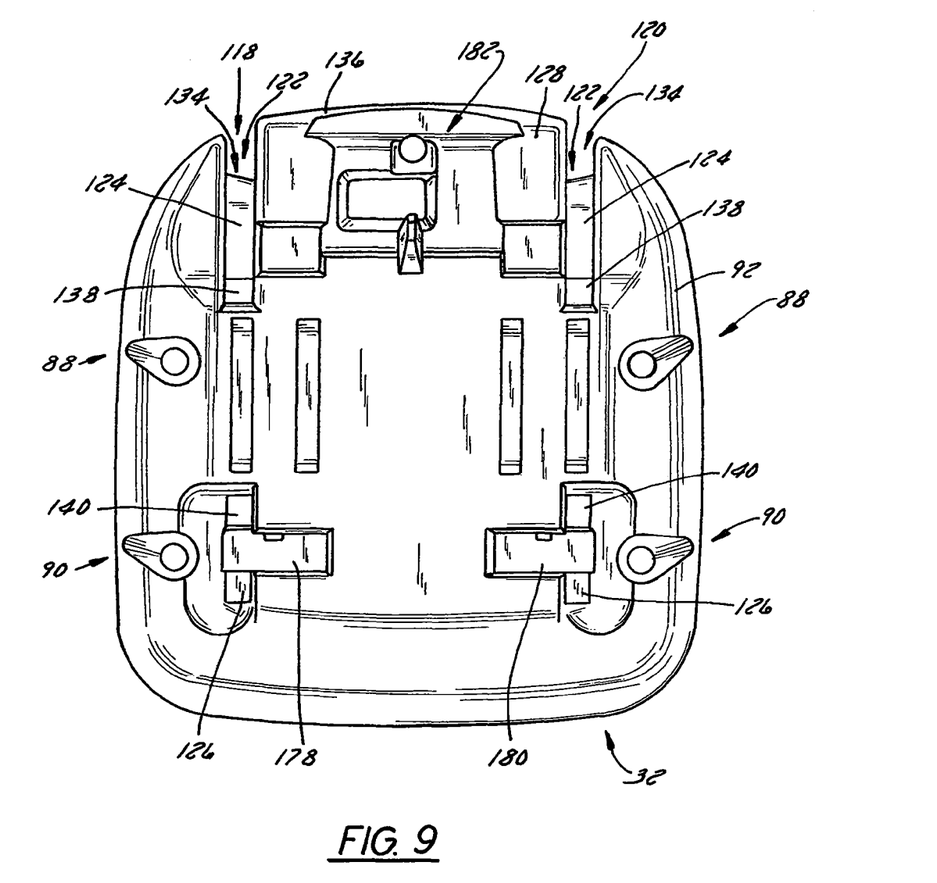
FIG. 9 is a bottom plan view of the seat base.

FIGS. 8 and 9 illustrate top and bottom views of the seat base 32 depicting integrally formed coupling tube-receiving sockets 118, 120. Seat base 32 is preferably made of a moldable material, preferably plastic, and is made by plastic injection molding, blow molding, rotomolding or another suitable molding process. Each socket 118, 120 includes an integrally formed elongate coupling tube channel 122 having a cross-sectional contour that is complementary to that of the coupling tube 38, 40 it receives during assembly. Each U-shaped channel 122 has a pair of aligned channel segments 124, 126 integrally formed in a bottom surface 128 of the seat base 32 that are aligned and communicate with an intermediate bridging channel segment 130 formed in an interior surface 132 of the seat base 32. Openings 138, 140 are disposed at or adjacent the transition between segments 124 and 130 and 130 and 126. When a coupling tube 38 or 40 is inserted into each one of the channels 122, alternating channel segments 124, 130, and 126 create a structure to oppose moments created by forces applied to the backrest base 34, such as from the force exerted by a seat occupant against the backrest. Each channel segment 124 communicates with a coupling tube seat 134 that is a notch integrally formed in a rear wall 136 of the seat base 32 having a cross section complementary to that of coupling tube 38 or 40. Seat 134 is generally perpendicular or transverse to channel segment 124 for receiving a portion of one of the coupling tubes 38 or 40 at or adjacent its bend 72 serving to help locate the backrest base coupling tube section 70 for receiving the backrest base 34. As is shown in FIG. 2, a portion of the backrest coupling tube section 70 adjacent bend 72 is received in part of the seat 134. Seat 134 also helps limit the depth of insertion of the seat base coupling tube section 68 into the corresponding channel 122 in the seat base 32 while orienting the backrest base coupling tube sections 70 of each coupling tube 38 and 40 for receiving the backrest base 34.

Figure 10:
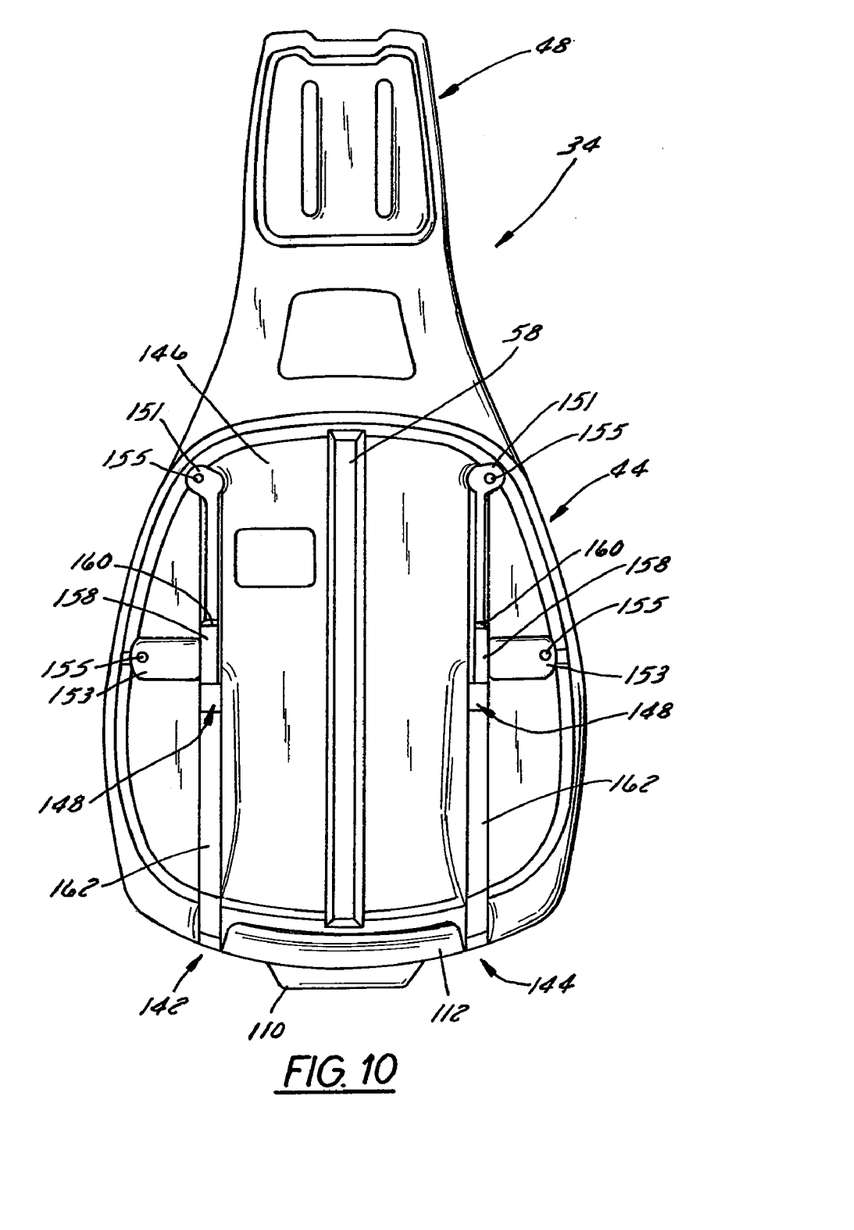
FIG. 10 is a front elevational view of the backrest base.
Figure 11:
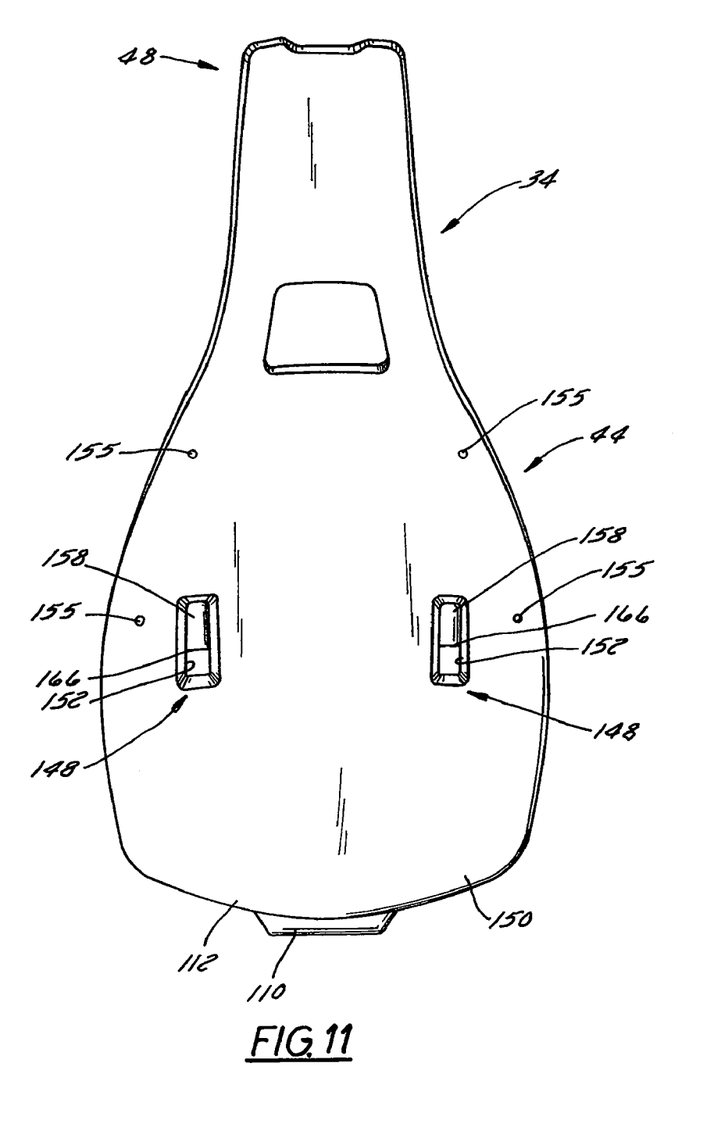
FIG. 11 is a rear elevational view of the backrest base.

FIGS. 10 and 11 illustrate front and rear views of the backrest base 34. Backrest base 34 is also made of a moldable material, preferably plastic, and is made by plastic injection molding, blow molding, rotomolding or another suitable molding process. Backrest base 34 includes an integrally formed back or lumbar supporting region 44 to which backrest cushion 46 is attached. Backrest base 34 also advantageously can have an integrally formed headrest support 48 to which headrest cushion 50 can be attached. In a preferred embodiment, the back or lumbar supporting portion 44 and headrest support 48 are both integrally formed in a backrest base 34 that is of one-piece, unitary and substantially homogenous construction.

The backrest base 34 has a pair of spaced apart elongate backrest coupling tube section receiving channels 142, 144 integrally formed in an interior surface 146 of the backrest base 34. Each channel 142, 144 has an integrally formed coupling tube-end capturing pocket 148 that releasably captures one end of a corresponding coupling tube 38, 40. With reference to FIG. 11, the backrest base 34 has a rear surface 150 with an integrally formed elongate coupling tube anchor opening 152 in communication with each pocket 148 that can be oblong, oval or generally rectangular in shape. The backrest base 34 also has a plurality of pairs of handgrip mounts 151, 153 integrally formed in its interior surface 146. Each mount can include a pilot hole 155 or the like to receive a rivet or in which a nut or the like is fixed.

Figure 12:
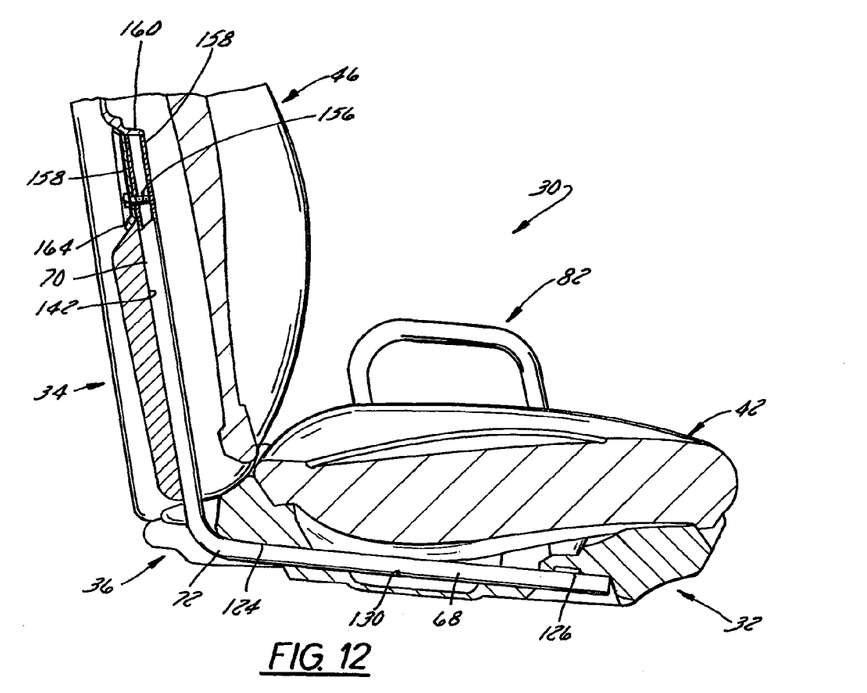
FIG. 12 is a partial fragmentary cross sectional view of the seat assembly assembled.
Figure 13:
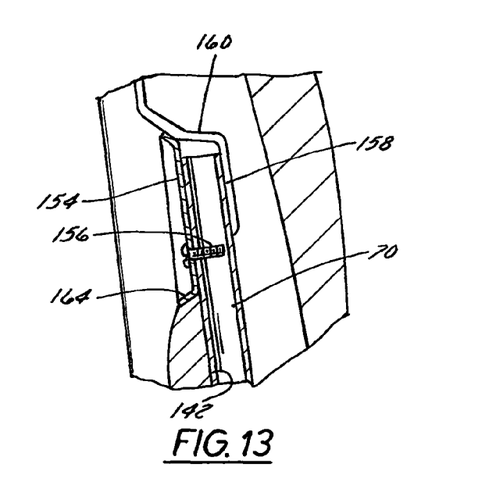
FIG. 13 is an enlarged fragmentary cross sectional view illustrating a mounting arrangement for securing a coupling tube in a pocket of a channel of the backrest base.

As is best shown in FIGS. 2, 7, 12 and 13, a complementarily shaped elongate anchor cover 154 that is a plate caps the opening 152 and receives a fastener 156, such as a screw or bolt, that engages part of the backrest base coupling tube section 70 of a corresponding one of the coupling tubes 38 and 40 securing the backrest base 34 thereto. As is shown in FIGS. 12 and 13, each pocket 148 has a sidewall 158 generally parallel to a longitudinal direction of the coupling tube 38, 40 received therein and which extends across its corresponding channel 142, 144. Sidewall 158 preferably is also flat for abutting a corresponding flat side of the coupling tube 38, 40 received in the pocket 148. Each pocket 148 also has an end wall 160 that is generally transverse to sidewall 158 and which can be generally perpendicular. End wall 160 overlies the free end of the backrest base coupling tube section 70 of the coupling tube 38 or 40 received in the pocket 148. Each end wall 160 can function as a stop to help limit the extent of insertion of a corresponding one of the coupling tubes 38, 40 into its channel 142, 144 during assembly.

When the backrest base coupling section 70 of each coupling tube 38, 40 is inserted into its corresponding channel 142, 140, the free end of each tube 38, 40 is received in pocket 148. An anchor cover 154 is manipulated so as to overlie its respective tube anchor opening 152 and fastener 156 is inserted through a bore in the cover 154. Fastener 156 is then engaged with a portion of the backrest base coupling tube section 70 received in the pocket 148 to draw the anchor cover 154 tightly against part of the outer backrest base surface that defines the periphery of the anchor opening 152 while pulling at least part of the coupling tube 38 or 40 against a bottom 162 of the channel 142, 144 in which the coupling tube is disposed. As a result, the backrest base coupling tube section 70 of each coupling tube 38 and 40 is positively anchored in place to the backrest base 34. Each anchor cover or plate 154 can be configured with an outer peripheral flange 164 that helps accurately locate and seat the cover 154 in its anchor opening 152 so as to abut against a lip 166 that extends about the inner periphery of opening 152.

In a preferred embodiment, the backrest base coupling section 70 of each coupling tube 38 and 40 can be configured with a bore in it that can be threaded to receive fastener 156 with the location of the bore helping to ensure proper mating of the seat base and backrest base mating surfaces 112, 116 as well as interlocking of the tongue 110 in the groove 114 when the seat base coupling tube section 68 of each coupling tube 38 and 40 has been inserted into its corresponding channel 120, 122 in the seat base 32. In other words, fastener 156 cannot be inserted into the bore to engage backrest base coupling tube section 70 unless and until the mating surface 112 of the backrest base 34 mates with the mating surface 116 of the seat base 32 and the tongue 110 is interlocked in groove 114.

Figure 14:
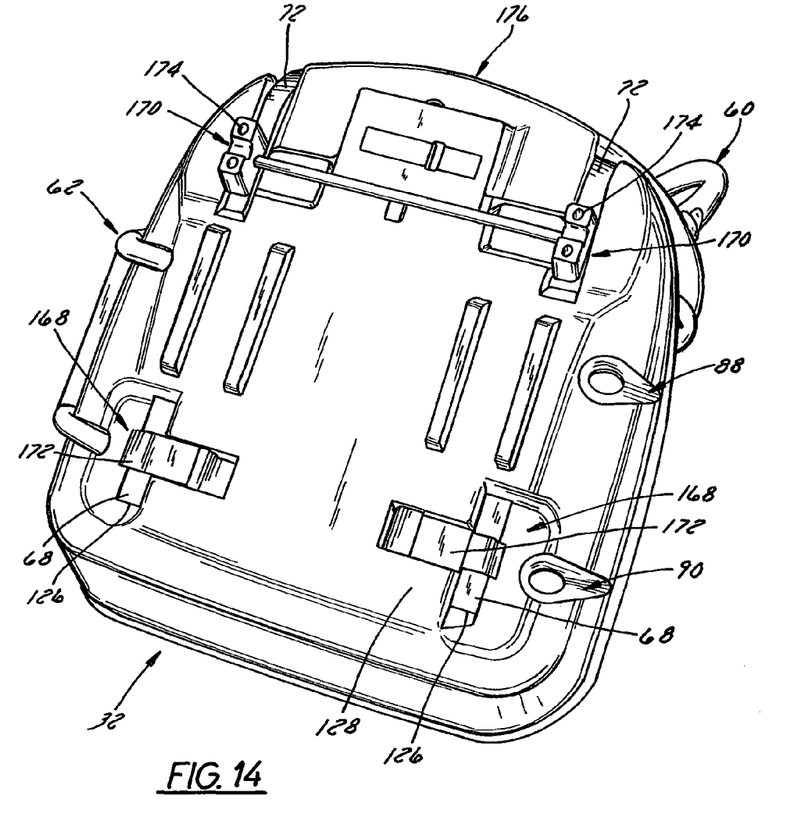
FIG. 14 is a bottom perspective view of a seat assembly with hardware mounted to the mounts formed where portions of the coupling tubes are exposed.

With reference to FIG. 14, as a result of the arrangement of channels 118, 120 in the seat base 32, front and rear mounting portions 168, 170 of each coupling tube 38, 40 are exposed enabling them to serve as fixture mounts 168, 170 to which hardware, such as brackets 172, 174 that facilitate mounting of the seat assembly 30 in a vehicle (not shown). Such brackets 172, 174 can be part of or cooperate with a fore-aft seat slide and adjuster (not shown) that enables fore-aft adjustment of the seat assembly 30. For example, rear brackets 174 can cooperate with a latching arrangement 176 of such a fore-aft seat slide and adjuster. With additional reference to FIG. 9, to facilitate attachment of such brackets 172, 174 as well as the latching arrangement 176, the bottom surface 128 of the seat base 32 has a plurality of integrally formed clearance or mounting pockets 178, 180 and 182.

In assembly, the seat base tube section 68 of each coupling tube 38, 40 is inserted into its respective socket 118, 120 formed in the seat base 32 until the bend 72 of each tube 38, 40 is received in the recessed seat 134 formed in the rear wall 136 of the seat base 32. Thereafter, the backrest base 34 is manipulated so as to position the backrest base tube section 70 of each coupling tube 38, 40 generally in-line with a corresponding channel 142, 144 formed in the backrest base 34. The backrest base 34 is then brought toward each coupling tube 38, 40 causing the backrest base tube section 70 of each tube 38, 40 to be slidably received in its corresponding channel 142, 144 until its free end is received in pocket 148.

As the backrest base 34 slidably receives each coupling tube 38, 40, its mating surface 112 approaches the mating surface 116 of the seat base 32 causing the tongue 110 to be received in the groove 114 when the free end of each tube 38, 40 seats in pocket 148 helping to lock each seat base tube section 68 in channel 112 of the respective socket 118, 120 thereby preventing disassembly. Such engagement provided by the tongue and groove arrangement also helps impart additional strength and additional structural rigidity to the seat assembly 30. Thereafter, each locking plate 154 is seated over a corresponding opening 148 in the rear wall 150 of the backrest base 34 and fastener 156 is inserted through the locking plate 154 and engaged, such as by threading, with part of the backrest base tube section 70 received in a pocket 148. As a result, the backrest base tube section 70 of each coupling tube 38, 40 is locked to the backrest base 34. As a result of the backrest base tube section 70 of each coupling tube 38, 40 being secured to the backrest base in this manner and the engagement provided by the tongue 110 being received in groove 114 securing and preventing withdrawal of the seat base tube section 68 of each coupling tube 38, 40 from the seat base 32, a seat assembly 30 of strong, robust, durable and long lasting construction is advantageously produced.

Any additional hardware, such as brackets 172, 174 and/or any latching arrangement 176 can be attached to the exposed mounting portions 168, 170 of the coupling tubes 38, 40 any time after insertion of the seat base coupling tube section 68 into its corresponding socket 118, 120. This can be done before or after assembly of the backrest base 34 to the tubes 38, 40.

Various alternatives are contemplated as being within the scope of the following claims particularly pointing out and distinctly claiming the subject matter regarded as the invention. For example, sockets and channels formed in the seat base 32 can be instead be provided in the backrest base 34 with the sockets and channels formed in the backrest base 34 provided in the seat base 34. In this same manner, the tongue can be provided on the seat base 32 and the groove formed in the backrest base 34. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A seat assembly comprising;
   a seat base having an endwall;
   a backrest base having an endwall; and
   a coupling arrangement attaching the seat base and backrest base comprising a generally L-shaped elongate coupler having one coupling section slidably received in the seat base engaging the seat base and another coupling section slidably received in the backrest base engaging the backrest base; and
   wherein the seat base endwall and the backrest base endwall are configured to engage one another when the coupling arrangement is attaching the seat base and backrest base: and
   wherein engagement between the seat base endwall and backrest base endwall prevents disengagement of one of the coupling sections of the coupler from one of the seat base and the backrest base when the coupling arrangement is attaching the seat base and backrest base.

2. The seat assembly of claim 1 wherein one of the seat base endwall and backrest base endwall comprises an outwardly projecting tongue and the other one of the seat base endwall and backrest base endwall comprises a recessed tongue-receiving groove formed therein that receives the tongue when the seat base and backrest are attached to the coupling arrangement interlocking the seat base and backrest base preventing disengagement of one of the coupling sections of the coupler from one of the seat base and backrest base.

3. The seat assembly of claim 2 wherein one section of the coupler is received in a socket integrally formed in the seat base engaging the seat base and another section of the coupler is received in a socket integrally formed in the backrest base engaging the backrest base.

4. A seat assembly comprising:
   a seat base comprising a socket integrally formed therein;
   a backrest base comprising a socket integrally formed therein;
   an elongate coupler coupling the seat base to the backrest base, the coupler comprising an angled coupling tube having a bend between a pair of elongate coupling sections with one of the coupling sections received in the socket in the seat base engaging the base and the other one of the coupling sections received in the socket in the backrest base engaging the base; and
   wherein engagement between a portion of the seat base and a portion of the backrest base when the coupler is coupling the seat base to the backrest base prevents disengagement of one of the coupler sections from one of the seat base and the backrest base.

5. The seat assembly of claim 4 wherein the socket integrally formed in one of the seat base and backrest base comprises a channel having a pocket in which a corresponding one of the coupling sections of the coupling tube is received, and further comprising a locking plate that engages the coupling tube through the pocket securing the coupling tube to the one of the seat base and backrest base.

6. The seat assembly of claim 4 wherein the socket integrally formed in the seat base comprises a recessed seat in which a portion of the bend of the coupling tube seats.

7. The seat assembly of claim 1 wherein the seat base has a plurality of integrally formed sockets, the backrest base has a plurality of integrally formed sockets, and the coupling arrangement comprises a plurality of elongate angled couplers each having a first elongate coupling section received in a corresponding one of the plurality of sockets in the seat base engaging the seat base and a second elongate coupling section received in a corresponding one of the plurality of sockets in the backrest base engaging the backrest base.

8. The seat assembly of claim 7 wherein each one of the plurality of sockets formed in the seat base comprises an elongate channel in which the first elongate coupling section of a corresponding one of the plurality of couplers is received and each one of the plurality of sockets formed in the backrest base comprises an elongate channel in which the second elongate coupling section of a corresponding one of the couplers is received.

9. The seat assembly of claim 8 wherein each one of the elongate channels in one of the seat base and backrest base comprises a pocket in which an end of a corresponding one of the couplers is received and comprises a locking plate that engages part of the coupler at or adjacent the end that is received in the pocket securing the one of the seat base and backrest base thereto.

10. The seat assembly of claim 9 wherein each locking plate further comprises a fastener that engages the part of the coupler at or adjacent the end that is received in the pocket.

11. The seat assembly of claim 7 wherein one of the seat base and backrest base comprises a tongue and other one of the seat base and backrest base comprises a groove that receives the tongue when the seat base and backrest base are assembled to the couplers keeping the elongate coupling section of each one of the plurality of couplers in the corresponding socket in one of the seat base and backrest base.

12. The seat assembly of claim 11 wherein one of the seat base and backrest base comprise a first mating surface from which the tongue outwardly projects and the other one of the seat base and the backrest base comprise a second mating surface in which the groove is integrally formed wherein the first and second mating surface oppose one another when the seat base and backrest base are assembled to the couplers.

13. The seat assembly of claim 7 wherein one of the seat base and backrest base further comprises a recessed seat formed in an endwall in communication with each one of the sockets formed in the one of the seat base and backrest base and wherein each one of the couplers has a bend disposed between each one of the elongate coupler sections that is receivable in the seat.

14. The seat assembly of claim 7 wherein each one of the couplers comprises an elongate generally L-shaped coupling tube having a bend between the elongate coupling sections, wherein each one of the plurality of sockets integrally formed in the seat base comprises a first elongate channel in which one elongate coupling section of a corresponding one of the coupling tubes is received with the elongate channel in communication with a seat in which a portion of the bend of a corresponding one of the coupling tubes is received and each one of the sockets integrally formed in the backrest base comprises an elongate channel and a pocket in which an end of the other coupling section of a corresponding one of the coupling tubes is received.

15. The eat assembly of claim 14 further comprising a locking arrangement that secures the other one of the elongate coupling sections in each pocket.

16. A seat assembly comprising:
a seat base having a first channel;
a backrest base having a second channel;
a coupler attaching the seat base to the backrest base, the coupler having a first coupling section received in the first channel in the seat base, a second coupling section received in the second channel in the backrest base, and a bend between the first and second coupling sections;

wherein one of the seat base and backrest base has a wall in which a recessed seat is integrally formed in which at least part of the bend seats when the coupler is attaching the seat base to the backrest base:
wherein one of the seat base and backrest base comprises a pocket in communication with one of the first channel in the seat base and the second channel in the backrest base; and
an anchor in communication with the pocket engaging part of a corresponding one of the first and second coupling sections.

17. The seat assembly of claim 16 further comprising tongue and groove engagement between the seat base and the backrest base when the coupler is attaching the seat base to the backrest base providing an interlock that keeps at least one of the first and second coupling sections in a respective one of the first and second channels.

18. The seat assembly of claim 16 wherein the coupler comprises an elongate generally L-shaped coupling tube with the first and second coupling sections each comprising an elongate segment of tubing between which the bend is disposed.

19. The seat assembly of claim 18 wherein the first channel formed in the seat base comprises a plurality of channel sections with one of the plurality of channel sections formed in a bottom of the seat base that exteriorly exposes a portion of the elongate segment of tubing received in the first channel.

20. The seat assembly of claim 19 wherein the exposed portion of the tube comprises a mount and further comprising hardware attached to the mount.

21. The seat assembly of claim 19 wherein each elongate segment of tubing is straight.

22. The seat assembly of claim 16 wherein the seat base has a rear wall in which the recessed seat is integrally formed in which at least part of the bend seats when the first coupling section is received in the first channel in the seat base and the second channel in the backrest base comprises the pocket in which an end of the second coupling section is received.

23. The seat assembly of claim 22 wherein the anchor comprises a locking plate that carries a fastener that engages part of the second coupling section disposed in the pocket securing the backrest base to the coupler.

24. The seat assembly of claim 23 wherein one of the seat base and the backrest base comprises a tongue and the other one of the seat base and the backrest base comprises a groove that receives the tongue engaging the seat base and the backrest base when attached by the coupler.

25. A seat assembly comprising:
a seat base having a plurality of integrally formed fore-aft extending channels;
a backrest base having a plurality of integrally formed and generally upwardly extending channels;
a plurality of coupling tubes attaching the seat base to the backrest base with the plurality of coupling tubes comprising a first coupling tube section received in a corresponding one of the fore-aft extending channels, and a second coupling tube section received in a corresponding one of the generally upwardly extending channels; and
wherein one of the seat base and backrest base comprises a tongue and the other one of the seat base and backrest base comprises a groove providing engagement between the seat base and backrest base.

\* \* \* \* \*

UNITED STATES PATENT AND TRADEMARK OFFICE
CERTIFICATE OF CORRECTION

PATENT NO. : 8,096,621 B2  
APPLICATION NO. : 12/484121  
DATED : January 17, 2012  
INVENTOR(S) : Kenneth Braun It is certified that error appears in the above-identified patent and that said Letters Patent is hereby corrected as shown below:

<u>ON THE TITLE PAGE, ITEM</u>

(73) Assignee:

Please amend the assignee to read:

-- Milsco Manufacturing Company, a Unit of Jason Incorporated --

Signed and Sealed this

Thirteenth Day of March, 2012

David J. Kappos  
*Director of the United States Patent and Trademark Office*